United States Patent
Sugiyama

[11] Patent Number: 5,981,052
[45] Date of Patent: Nov. 9, 1999

[54] INORGANIC POROUS CRYSTALS-HYDROPHILIC MACROMOLECULE COMPOSITE

[75] Inventor: Kouju Sugiyama, Osaka, Japan

[73] Assignee: Rengo Co., Ltd., Osaka, Japan

[21] Appl. No.: 08/918,385

[22] Filed: Aug. 26, 1997

[30] Foreign Application Priority Data

Aug. 27, 1996 [JP] Japan .................................. 8-245538

[51] Int. Cl.$^6$ ............................. D21H 17/68; C08K 7/26; B32B 3/26; B01J 29/06
[52] U.S. Cl. ....................... 428/311.71; 252/1; 428/304.4; 428/311.11; 428/312.2; 428/312.4; 428/312.6; 502/63
[58] Field of Search .................................. 252/1; 502/60, 502/61, 63, 64, 74, 77; 428/304.4, 311.11, 311.71, 312.2, 312.4, 312.6

[56] References Cited

U.S. PATENT DOCUMENTS 4,826,667  5/1989  Zones et al. ............................. 423/277

FOREIGN PATENT DOCUMENTS 5-106199  4/1993  Japan .
7-88819   4/1995  Japan .

OTHER PUBLICATIONS

CAPLUS 1998: 56024, 1998.
WPIDS 98–140868, 1998.
WPIDS 93–173052, 1993.
Database WPI, Week 8103, Derwent Publications Ltd., AN 81–02886D (JP 55144489 abstract) 1981.
Database WPI, Week 8238, Derwent Publications Ltd., AN 82–79693E (JP 57129779 abstract), 1982.
Database WPI, Week 8719, Derwent Publications Ltd., AN 87–132636 (JP 62072938 abstract) 1987.
Database WPI, Week 9223, Derwent Publications Ltd., AN 92–188655 (JP 04122743 abstract) 1992.
Database WPI, Week 9309, Derwent Publications Ltd., AN 93–070825 (JP 05017124 abstract) 1993.
Database WPI, Week 9321, Derwent Publications Ltd., AN 93–173052 (JP 05105199 abstract) 1993.
Database WPI, Week 9325, Derwent Publications Ltd., AN 93–200978 (JP 05125694 abstract) 1993.

*Primary Examiner*—Shean C. Wu
*Attorney, Agent, or Firm*—Leydig, Voit & Mayer, Ltd.

[57] ABSTRACT

An inorganic porous crystals-hydrophilic macromolecule composite comprising a hydrophilic macromolecular substrate containing the inorganic porous crystals in its inner matrix, production method thereof and use thereof. The present invention affords an inorganic porous crystals-hydrophilic macromolecule composite comprising the inorganic porous crystals held in the inner matrix of the hydrophilic macromolecular substrate. This composite is particularly superior in adsorption of metal ion, specifically silver and copper ions, and the metal-holding inorganic porous crystals-hydrophilic macromolecule composite showed noticeably strong adsorption of hydrogen sulfide and the like, so that it can be used as a deodorizer, antimicrobial material and freshness retention material for fruits and vegetables.

13 Claims, 11 Drawing Sheets

INORGANIC POROUS CRYSTALS-HYDROPHILIC MACROMOLECULE COMPOSITE

TECHNICAL FIELD OF THE INVENTION

The present invention relates to an inorganic porous crystals-hydrophilic macromolecule composite, production method thereof and use thereof.

BACKGROUND OF THE INVENTION

There have been made various attempts to carry an inorganic compound, such as zeolite and aluminosilica gel, on a hydrophilic macromolecular substrate, such as cellulose substrate (e.g. paper), to impart various functions. Such attempts conventionally include coating and addition during paper making process. According to these prior art techniques, however, the above-mentioned inorganic compound, which is generally called a filler, is merely held on the surface of a substrate, or when the substrate is paper, in gaps between fiber and fiber, by the action of an adhesive, yield improving agents, binder and the like.

As a consequence, these methods are associated with a limitation on the amount of the filler to be held, and with marked inhibition of desired ion exchange capability and adsorbability, despite the desire to utilize the function of porous material such as zeolite, since the adhesive, yield improving agents, binder and the like block fine pores present on the surface of zeolite and the like.

When paper is manufactured by these methods, the filler coagulates as a result of the action of the above-mentioned binder and the like, thereby clogging a paper making wire. Thus, the paper making process itself is difficult to complete. In addition, the resulting paper sometimes loses strength significantly, because the filler held on between fibers inhibits the hydrogen bonding between fibers.

To solve these problems in the paper making procedure, for example, a starting material of inorganic compound, such as aluminosilica gel, is added to the pulp to be manufactured into paper to allow reaction within the pulp, so that the resulting paper can have improved properties. For example, Japanese Patent Unexamined Publication No. 125694/1993 discloses a method comprising impregnating paper with an aqueous solution of an alkali metal salt of silicic acid (silicate) to allow contact with an acidic gas, thereby carrying the silicic acid, to manufacture an inorganic paper having optical property, adsorbability, oil absorbability and printability. Japanese Patent Unexamined Publication No. 106199/1993 discloses a method comprising immersing fiber holding an inorganic silicon compound, in an aqueous solution of aluminate, and immersing same in an aqueous solution containing at least one member selected from water-soluble salts of copper, silver and zinc, to afford antibacterial property, deodorizing property and adsorbability of the fiber.

These inorganic paper and fiber nevertheless show poor adsorption of the ion of transition metal such as silver and copper, and the metal-substituted silicic acid-carrying inorganic paper and metal-substituted aluminosilica gel fiber show poor deodorizing property. Therefore, a carrier taking the place of the silicic acid and aluminosilica gel has been desired.

In other words, inorganic porous crystals, such as zeolite and hydrotalcite capable of holding metal and the like better than aluminosilica gel and the like, are desired to be held in the inner matrix of hydrophilic macromolecular substrate such as cellulose.

SUMMARY OF THE INVENTION

It is therefore an object of the present invention to solve the above-mentioned problems and form inorganic porous crystals in the inner matrix of a hydrophilic macromolecular substrate, to provide an inorganic porous crystals-hydrophilic macromolecule composite.

Another object of the present invention is to provide a method for producing the above-mentioned hydrophilic macromolecule composite.

Yet another object of the present invention is to provide a metal-holding inorganic porous crystals-hydrophilic macromolecule composite.

According to the present invention, it has been found that inorganic porous crystals can be formed in the inner matrix of a hydrophilic macromolecular substrate swollen in an aqueous solution from among the synthetic conditions of the inorganic porous crystals to be held by the hydrophilic macromolecular substrate, which resulted in the completion of the invention.

That is, the present invention provides the following.

(1) An inorganic porous crystals-hydrophilic macromolecule composite comprising a hydrophilic macromolecular substrate containing inorganic porous crystals in its inner matrix.

(2) The inorganic porous crystals-hydrophilic macromolecule composite of (1) above, wherein the hydrophilic macromolecular substrate is a cellulose substrate.

(3) The inorganic porous crystals-hydrophilic macromolecule composite of (1) above, wherein the inorganic porous crystal is zeolite.

(4) A method for producing an inorganic porous crystals-hydrophilic macromolecule composite, which comprises reacting plural water-soluble compounds and at least one basic substance, in the inner matrix of a swollen hydrophilic macromolecular substrate.

(5) The method according to (4) above, wherein the plural water-soluble compounds comprise at least one silicon compound and at least one aluminum compound.

(6) The method according to (4) above, wherein the reaction is carried out at 20–90° C.

(7) The method according to (4) above, wherein the basic substance has a concentration of 10–5000 mmol/$\ell$.

(8) The method according to (5) above, wherein the silicon compound, aluminum compound and basic substance are mixed in a molar ratio (silicon compound:aluminum compound:basic substance) of 1:1–10:10–50.

(9) The method according to (4) above, wherein the basic substance is sodium hydroxide or potassium hydroxide.

(10) A method for producing an inorganic porous crystals-hydrophilic macromolecule composite, which comprises impregnating a hydrophilic macromolecular substrate with an aqueous solution of one of silicon compound and aluminum compound, and then mixing an aqueous solution of the other compound in the presence of at least one basic substance, thereby to carry inorganic porous crystals in the inner matrix of the hydrophilic macromolecular substrate.

(11) A metal-holding inorganic porous crystals-hydrophilic macromolecule composite, comprising the inorganic porous crystals-hydrophilic macromolecule composite of (1) above and at least one kind of metal held on the composite, which is selected from silver, copper, zinc, iron, nickel, cobalt, palladium and platinum.

DETAILED DESCRIPTION OF THE INVENTION

The hydrophilic macromolecular substrate to be used in the present invention is subject to no particular limitation as long as it swells in water. Examples thereof include pulp, cellulose, regenerated cellulose (e.g., cellophane, cellulose beads, rayon, cellulose sponge and the like), cotton, bacterial cellulose, cellulose derivative which is a chemically modified cellulose, such as ethyl cellulose, hydroxyethylcellulose, hydroxypropylcellulose, methylcellulose, ethylhydroxyethylcellulose, carboxymethylcellulose and the like, natural or artificial hydrophilic macromolecules such as silk, wool, polyvinyl alcohol, crosslinked polyvinyl alcohol, chitin, chitosan, ethylene-vinyl acetate copolymer, polyvinyl formal and the like, highly water-absorbable macromolecular gels such as polyacrylamide, and the like.

Of these, pulp and regenerated cellulose are preferably used as carrying substrates from the aspect of actual use, cost and easiness of handling.

The inner matrix of hydrophilic macromolecular substrate in the present invention means, when the substrate is a cellulose, the inside of the macromolecular substance constituting the cellulose substrate, excluding the surface of the cell wall of cellulose fiber, fine pores present in the cell wall and lumen.

The inorganic porous crystal in the inner matrix of cellulose substrate means that a part or the entirety of inorganic porous crystals is present in the inner matrix of cellulose substrate.

The inorganic porous crystal to be used in the present invention is exemplified by inorganic ion exchanger crystals having ion exchange capability and adsorber crystals capable of adsorbing to the porous part, and is free of limitation as long as it does not dissolve, decompose or disintegrate hydrophilic macromolecular substrate. For example, zeolite, hydrotalcite, hydroxyapatite, clay minerals and the like may be used.

Of these, zeolite is preferable in that it offers a wide range of use. In particular, 4A zeolite ($Na_{12}Si_{12}Al_{12}O_{48}*27H_2O$) is preferable, since it can be synthesized rather easily.

The inorganic porous crystals-hydrophilic macromolecule composite of the present invention can be prepared by reacting plural water-soluble compounds and at least one basic substance in the inner matrix of swollen hydrophilic macromolecular substrate. For example, when the inorganic porous crystal is zeolite, at least one silicon compound, at least one aluminum compound and at least one basic substance are used; and when the inorganic porous crystal is hydroxyapatite, at least one phosphorus compound (e.g., disodium hydrogen phosphate), at least one calcium compound (e.g., calcium nitrate) and at least one basic substance are used, whereby the inorganic porous crystals are held on a hydrophilic macromolecular substrate. When other inorganic porous crystals are produced in the inner matrix of a hydrophilic macromolecular substrate, the combination of plural water-soluble compounds is not particularly limited.

A production method of an inorganic porous crystals-hydrophilic macromolecule composite, when the inorganic porous crystal is zeolite and the hydrophilic macromolecule is a cellulose substrate, is exemplarily shown in the following to explain the method (Method I) in detail.

A zeolite-cellulose composite can be produced by, for example, impregnating a cellulose substrate with an aqueous solution of a silicon compound. The method for impregnation is not particularly limited, and the cellulose substrate may be immersed in the aqueous solution, or an aqueous solution may be sprayed on a cellulose substrate or applied using various coaters.

The silicon compound may be any as long as it dissolves in water, and is exemplified by sodium metasilicate, potassium metasilicate, potassium orthosilicate, water glass, silica sol and the like. In view of the fact that zeolite having high solubility in water and high crystallizability can be obtained, sodium metasilicate is preferably used. The concentration of the aqueous solution of silicon compound is not particularly limited, but it is preferably 1.0–100 mmol/$\ell$, more preferably 10–50 mmol/$\ell$.

When the cellulose substrate has been impregnated with an aqueous solution of silicon compound, the amount of the solution is preferably controlled. The method therefor includes scraping off with a blade, squeezing between rolls, squeezing with a press and the like. The amount of the solution after control is not particularly limited, but it is preferable that it be controlled to 1.0–20 fold amount of the dry weight of the cellulose substrate.

The cellulose substrate impregnated with an aqueous solution of silicon compound may be given an impregnating time before or after controlling the amount of the solution, so that the solution can sufficiently infiltrate therethrough. The impregnating time is from 10 minutes to 2 hours, which can be appropriately determined according to the kind of cellulose substrate to be used.

The cellulose substrate having a controlled amount of solution is then immersed in a mixed aqueous solution of aluminum compound and basic substance. Examples of aluminum compound include sodium aluminate, potassium aluminate, aluminum sulfate, aluminum chloride, aluminum nitrate and the like, with preference given to sodium aluminate, since it affords zeolite having high solubility in water and high crystallizability. While the concentration of the aqueous solution of aluminate is not particularly limited, it is preferably 1.0–1000 mmol/$\ell$, more preferably 10–500 mmol/$\ell$.

Examples of basic substance include sodium hydroxide, potassium hydroxide and the like, with preference given to sodium hydroxide, since it affords zeolite having high solubility in water and high crystallizability. The concentration of the basic substance need be considerably high to crystallize zeolite and is 10–5000 mmol/$\ell$, preferably 100–2500 mmol/$\ell$.

One or more silicon compound(s), aluminum compound (s) and basic substance(s) may be used in the present invention.

The temperature at which the substrate is immersed is 20–90° C., preferably 40–60° C. The immersing time is from 2 hours to 20 days, preferably from 12 hours to 2 days.

The mixing ratio (molar ratio) of the silicon compound, aluminum compound and basic substance in the presence of swollen cellulose substrate is silicon compound:aluminum compound:basic substance of 1:1–10:10–50, preferably 1:3–5:12–30.

The basic substance is added in excess of the silicon compound and aluminum compound. This is because, particularly in the case of 4A zeolite, zeolite crystal itself is in a metastable phase and cannot be synthesized under the conditions other than excess alkali conditions.

When the immersing temperature is from 20° C. to 90° C., the immersing time is from 2 hours to 20 days, and the mixing ratio (molar ratio) of the silicon compound, aluminum compound and basic substance (silicon compound:aluminum compound:basic substance) is 1:1–10:10–50, the inorganic porous crystals can be efficiently produced in the inner matrix of cellulose substrate.

A different method for producing a zeolite-cellulose composite includes first impregnating a cellulose substrate with an aqueous solution of aluminum compound, and then immersing same in a mixed aqueous solution of silicon compound and basic substance. Alternatively, a cellulose substrate is first impregnated with a mixed aqueous solution of basic substance and one of silicon compound and aluminum compound, and then immersed in an aqueous solution of the remaining compound. That is, an aqueous solution of the silicon compound and that of aluminum compound produce gel upon mixing the two compounds. Thus, they cannot be used simultaneously for impregnating the cellulose substrate. Any immersing order except this can be employed. For example, the cellulose substrate is impregnated with an aqueous solution of basic substance, and then immersed in an aqueous solution of silicon compound, whereafter finally immersed in an aqueous solution of aluminum compound, thus resulting in three steps. However, inasmuch as the zeolite-cellulose composite produced by these methods is somewhat inferior to the zeolite-cellulose composite produced by Method I in the zeolite-holding ratio, it is preferable that Method I be used.

Method I employs very mild synthetic conditions as compared to those of general synthesis of zeolite, so that zeolite can be held without causing damages to the cellulose substrate.

The above-mentioned inorganic porous crystals-hydrophilic macromolecule composite has superior strength, smoothness, flame retardance, opacity and dimensional stability, besides functions as ion exchanger and adsorber. Consequently, when the hydrophilic macromolecular substrate is a cellulose fiber and paper is to be manufactured therefrom, no operation difficulty is encountered such as clogging of paper making wire.

The above-mentioned inorganic porous crystals-hydrophilic macromolecule composite is taken out from the solution and washed with water, and then immersed in an aqueous solution of a metal salt capable of functioning as a catalyst, whereby a metal-holding inorganic porous crystals-hydrophilic macromolecule composite can be obtained. The metal to be used is exemplified by silver, copper, zinc, iron, nickel, cobalt, palladium and platinum, which may be used in combination. The aqueous solution of metal salt may have optional concentration, which is preferably 1.0–100 mmol/$\ell$, and is free of particular limitation on the temperature and time of immersion. The hydrophilic macromolecular substrate allows infiltration of an aqueous solution, so that the entirety of the inorganic porous crystals in the inner matrix of a hydrophilic macromolecular substrate can hold metal efficiently.

For example, a silver, copper or zinc-holding inorganic porous crystals-hydrophilic macromolecule composite shows antibacterial property, and a palladium or platinum-holding inorganic porous crystals-hydrophilic macromolecule composite can adsorb ethylene to retain freshness of fruits and vegetables. A silver or copper-holding inorganic porous crystals-hydrophilic macromolecule composite can adsorb and decompose hydrogen sulfide, thereby affording rust proof effect of metal and deodorizing effect, and can adsorb and decompose ammonia, thereby affording deodorizing effect. A silver-holding inorganic porous crystals-hydrophilic macromolecule composite can adsorb and decompose methyl mercaptane, thereby affording deodorizing effect.

Since a hydrophilic macromolecular substrate can sufficiently permeate gases, it can adsorb and decompose gasses while using the entire metal-holding inorganic porous crystals in the inner matrix of the hydrophilic macromolecular substrate.

In addition, a volatile substance may be added to the inorganic porous crystals-hydrophilic macromolecule composite to provide paper having various high functions. Examples of the volatile substance include L-menthol, hinokitiol, fitontsid, allyl isothiocyanate, limonene and the like. These can be held by a method known per se, such as impregnation, coating, injection and the like.

The present invention is described in more detail by way of Examples, which should not be construed as limiting the invention.

EXAMPLE 1

Figure 1A:
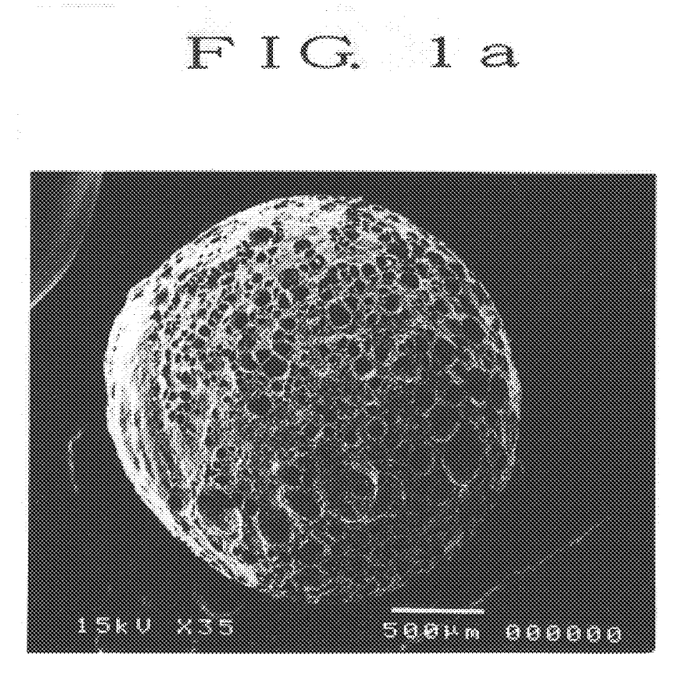
FIG. 1a is a scanning electron microscopic (hereinafter SEM) photograph of 4A zeolite-holding cellulose beads obtained in Example 1.
Figure 1B:
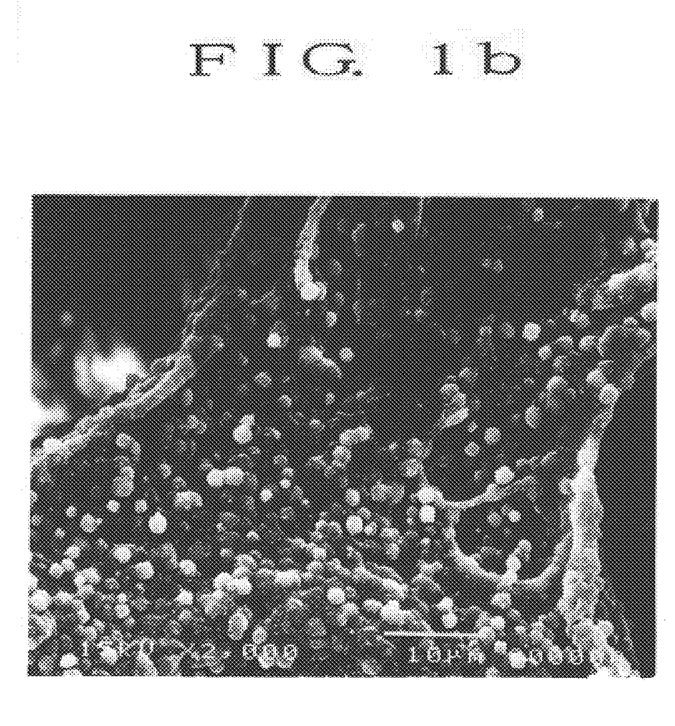
FIG. 1b is an SEM photograph showing an enlarged view of the cellulose beads.

Cellulose beads (10.0 g, average particle size 5 mm) were impregnated with an aqueous solution (5.68 g/100 ml) of sodium metasilicate.9 hydrate, and a mixed aqueous solution (100 ml) of sodium aluminate (4.68 g) and sodium hydroxide (10.00 g) was added, which was followed by immersion at 25° C. for 10 days, to give 4A zeolite-holding cellulose beads (11.2 g). The 4A zeolite-holding cellulose beads had a 4A zeolite-holding percentage of 20.8 wt%. An SEM photograph of the obtained 4A zeolite-holding cellulose beads is shown in FIG. 1a and an enlarged view thereof is shown in FIG. 1b.

EXAMPLE 2

Figure 2A:
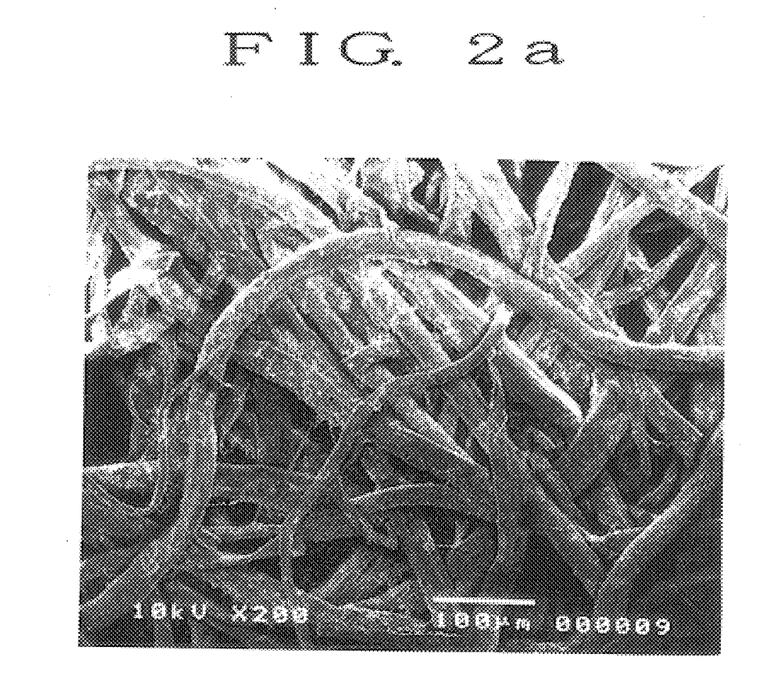
FIG. 2a is an SEM photograph of 4A zeolite-holding paper obtained in Example 2.
Figure 2B:
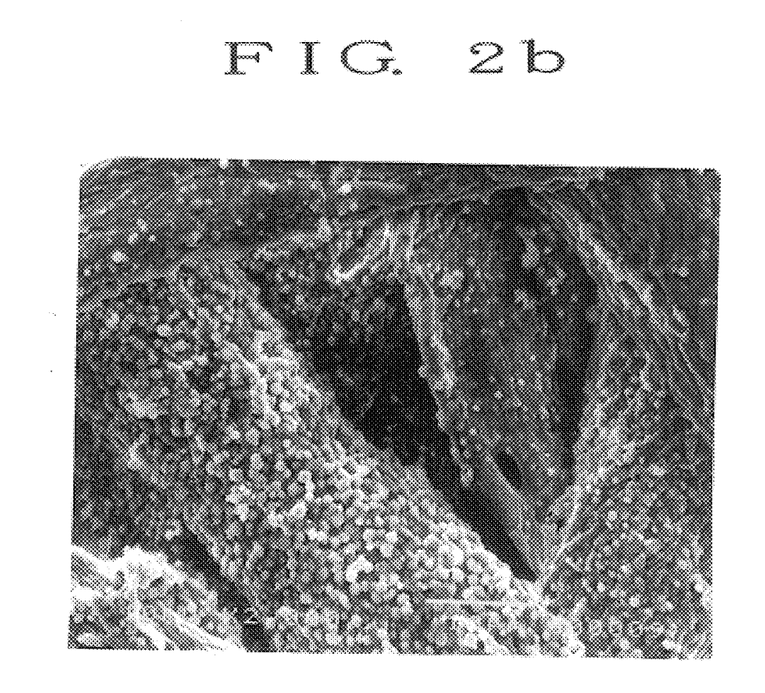
FIG. 2b is an SEM photograph showing an enlarged view of the paper.

Pulp (4.0 g) was impregnated with an aqueous solution (5.68 g/100 ml) of sodium metasilicate.9 hydrate, and a mixed aqueous solution (100 ml) of sodium aluminate (4.68 g) and sodium hydroxide (10.00 g) was added, which was followed by immersion at 90° C. for 2 hours, to give 4A zeolite-holding pulp. The 4A zeolite-holding pulp was prepared into paper using Square Type Sheet Machine manufactured by KUMAGAYA RIKI INDUSTRY Co., Ltd. (conditions: 80 mesh, natural water, suction, water 15 ℓ). The 4A zeolite-holding paper thus obtained had a 4A zeolite-holding percentage of 18.1 wt%. An SEM photograph of the obtained 4A zeolite-holding paper is shown in FIG. 2a and an enlarged view thereof is shown in FIG. 2b.

EXAMPLE 3

Figure 3A:
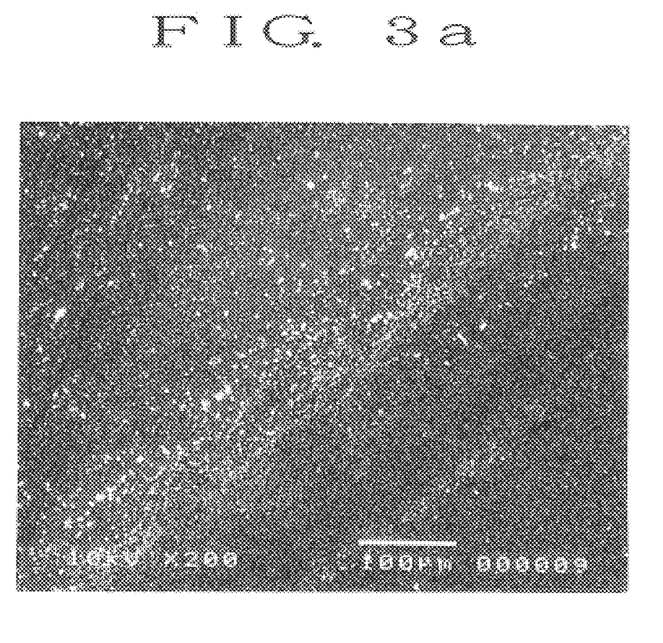
FIG. 3a is an SEM photograph of 4A zeolite-holding cellophane obtained in Example 3.
Figure 3B:
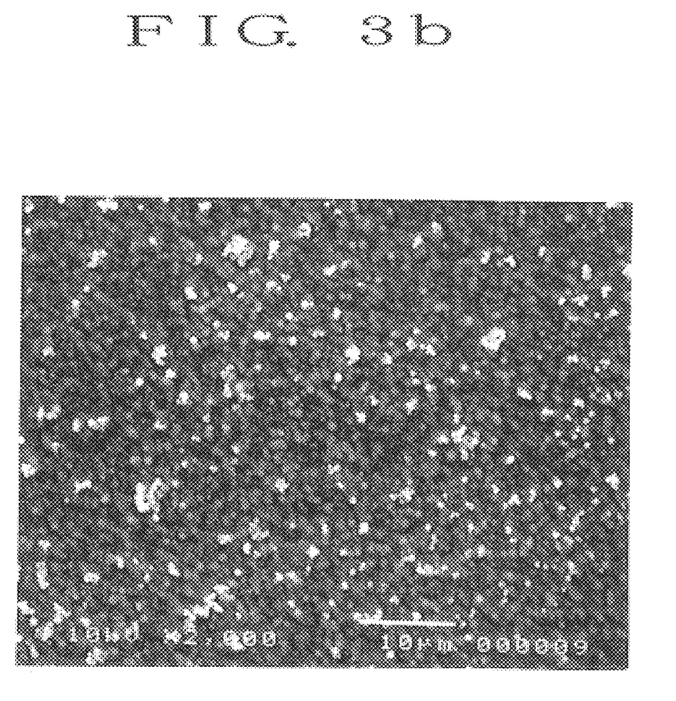
FIG. 3b is an SEM photograph showing an enlarged view of the cellophane.

Cellophane (0.548 g) was impregnated with an aqueous solution (0.2904 g/5 ml) of sodium metasilicate.9 hydrate, and a mixed aqueous solution (5 ml) of sodium aluminate (0.2360 g) and sodium hydroxide (0.5219 g) was added, which was followed by immersion at room temperature for 11 days, to give 4A zeolite-holding cellophane (0.652 g). The 4A zeolite-holding cellophane had a 4A zeolite-holding percentage of 23.8 wt%. An SEM photograph of the obtained 4A zeolite-holding cellophane is shown in FIG. 3a and an enlarged view thereof is shown in FIG. 3b.

EXAMPLE 4

Figure 4A:
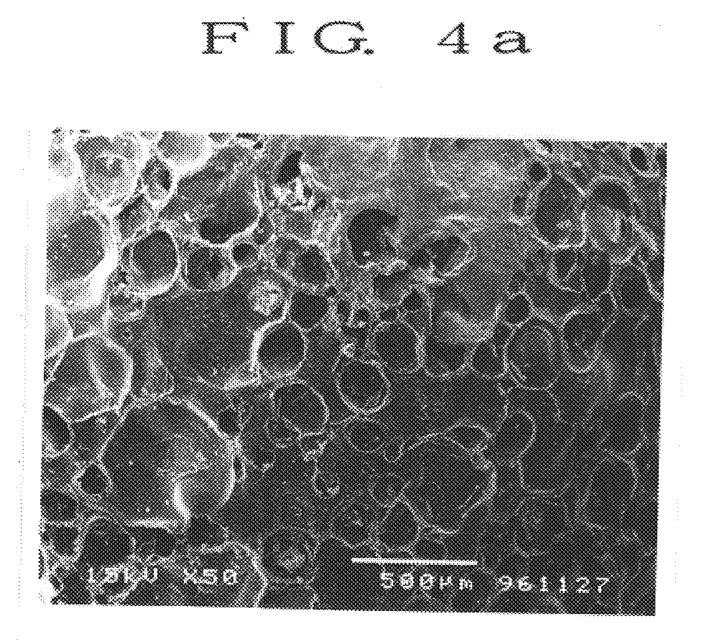
FIG. 4a is an SEM photograph of Y type zeolite-holding cellulose beads obtained in Example 4.
Figure 4B:
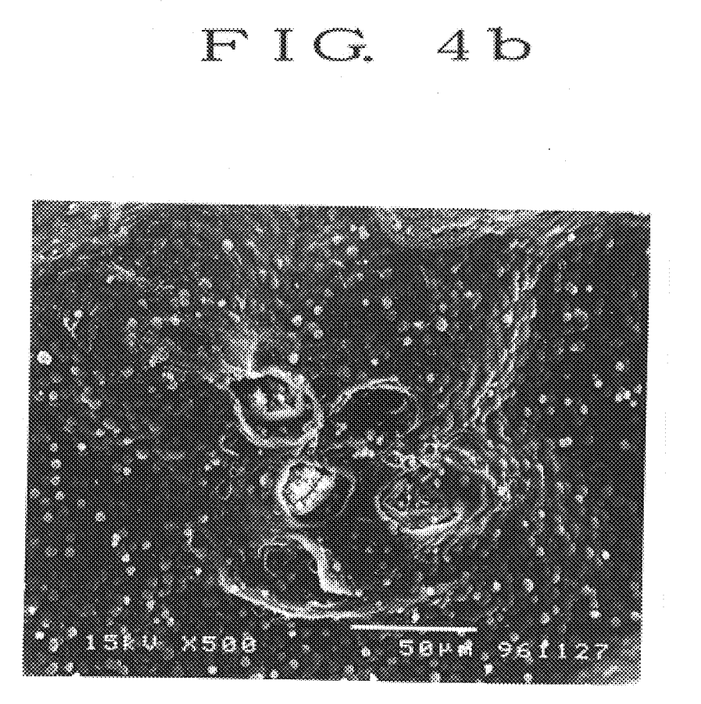
FIG. 4b is an SEM photograph showing an enlarged view of the cellulose beads.

Cellulose beads (10.0 g, average particle size 5 mm) were impregnated with an aqueous solution (2.50 g/50 ml) of sodium hydroxide, and 40 wt% silica sol (17.5 g) was added. Then, a mixed aqueous solution (50 ml) of sodium aluminate (2.50 g) and sodium hydroxide (2.50 g) was added, which was followed by maturation for one hour and immersion at 90° C. for 24 hours, to give Y type zeolite-holding cellulose beads (9.1 g). The Y type zeolite-holding cellulose beads had a zeolite-holding percentage of 17.3 wt%. An SEM photograph of the obtained Y type zeolite-holding cellulose beads is shown in FIG. 4a and an enlarged view thereof is shown in FIG. 4b.

EXAMPLE 5

Figure 5A:
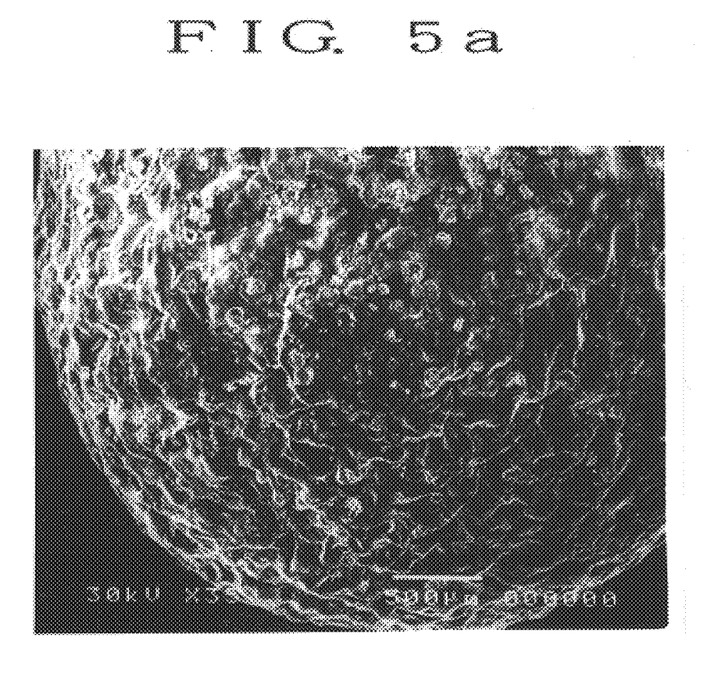
FIG. 5a is an SEM photograph of hydroxyapatite-holding cellulose beads obtained in Example 5.
Figure 5B:
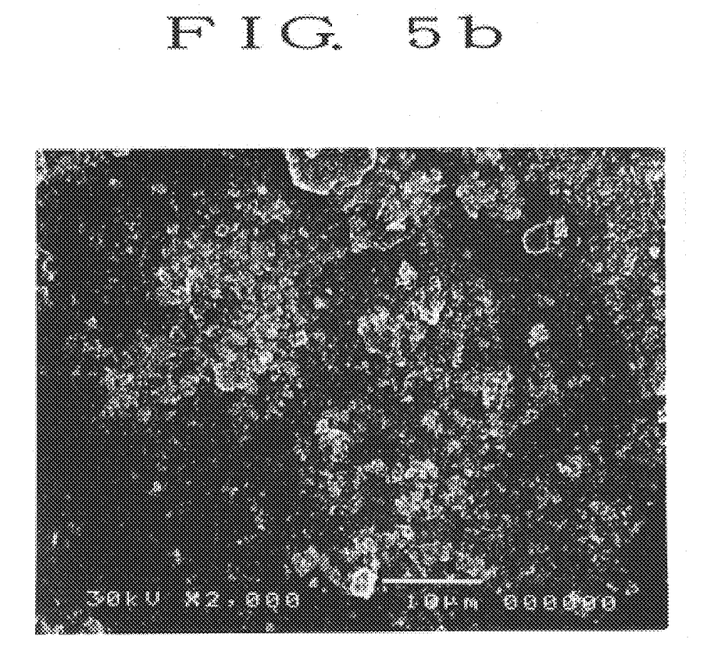
FIG. 5b is an SEM photograph showing an enlarged view of the cellulose beads.

Cellulose beads (10.0 g, average particle size 5 mm) were impregnated with a mixed aqueous solution (50 ml) of disodium hydrogen phosphate (6.45 g) and sodium hydroxide (1.00 g), and an aqueous solution (7.08 g/50 ml) of calcium nitrate.4 hydrate was added, which was followed by immersion at 90° C. for 2 hours, to give hydroxyapatite-holding cellulose beads (12.2 g). The obtained hydroxyapatite-holding cellulose beads had a hydroxyapatite-holding percentage of 18.0 wt%. An SEM photograph of the obtained hydroxyapatite-holding cellulose beads is shown in FIG. 5a and an enlarged view thereof is shown in FIG. 5b.

EXAMPLE 6

Figure 6A:
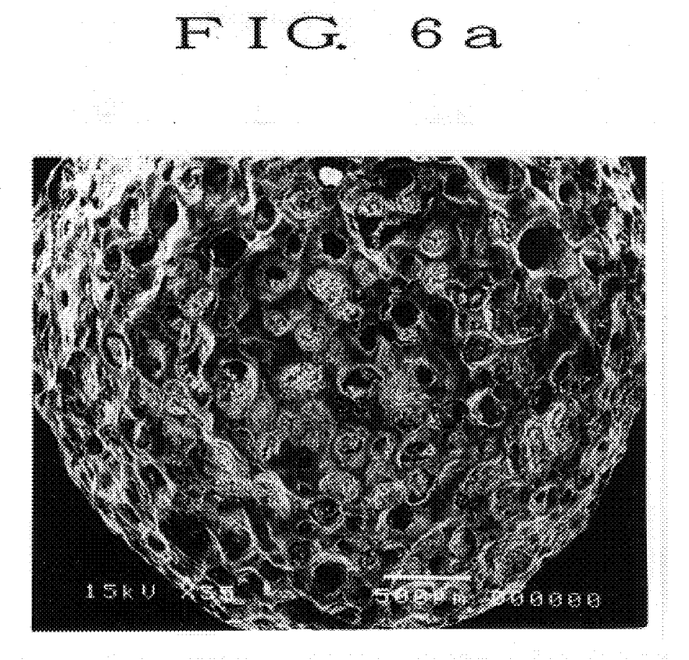
FIG. 6a is an SEM photograph of hydrotalcite-holding cellulose beads obtained in Example 6.
Figure 6B:
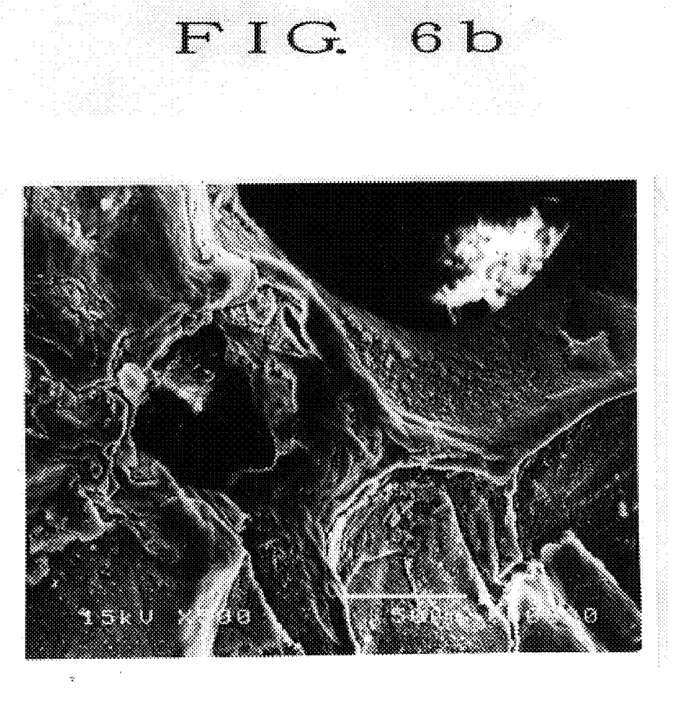
FIG. 6b is an SEM photograph showing an enlarged view of the cellulose beads.

Cellulose beads (10.0 g, average particle size 5 mm) were impregnated with an aqueous solution (50 ml) of sodium carbonate (0.66 g) and sodium hydroxide (4.00 g), and a mixed aqueous solution (50 ml) of aluminum nitrate.9 hydrate (4.69 g) and magnesium sulfate (4.51 g) was added, which was followed by immersion at 70° C. for 11 hours, to give hydrotalcite-holding cellulose beads (12.5 g). The obtained hydrotalcite-holding cellulose beads had a hydrotalcite-holding percentage of 20.0 wt%. An SEM photograph of the obtained hydrotalcite-holding cellulose beads is shown in FIG. 6a and an enlarged view thereof is shown in FIG. 6b.

EXAMPLE 7

Figure 7A:
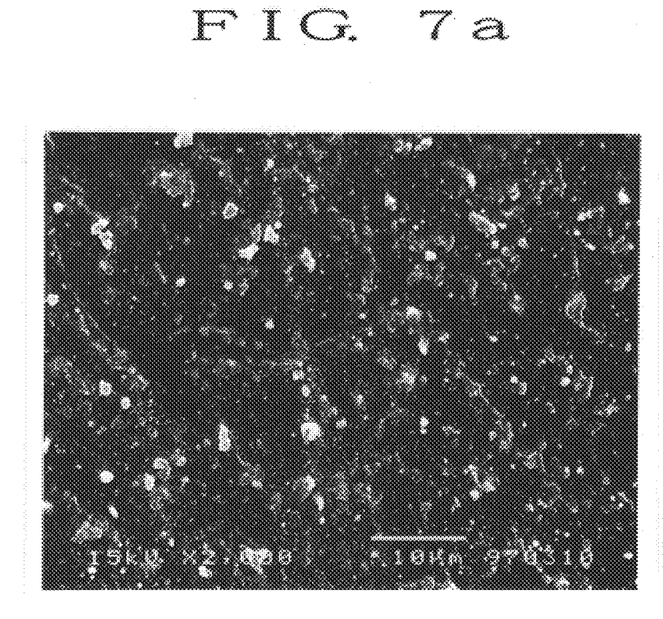
FIG. 7a is an SEM photograph of the surface of 4A zeolite-holding ethylene-vinyl acetate copolymer obtained in Example 7.
Figure 7B:
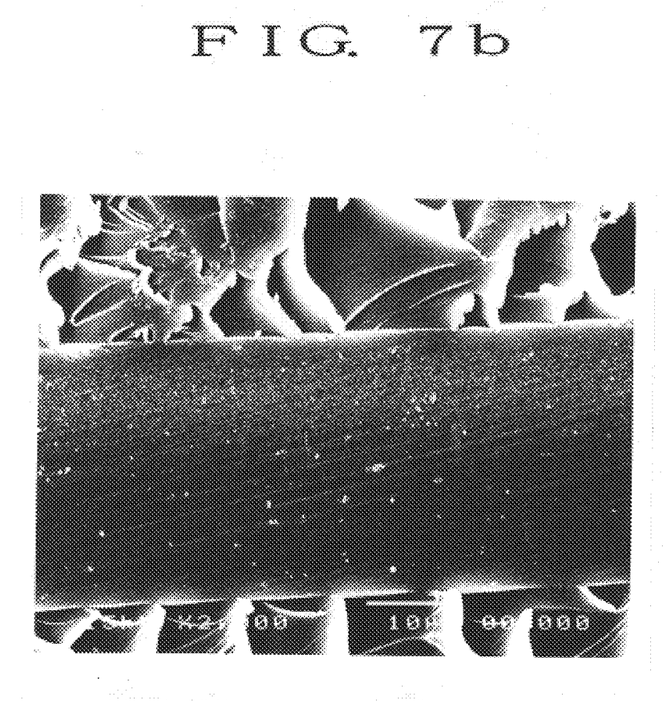
FIG. 7b is an SEM photograph showing the cross section thereof.

A film of ethylene-vinyl acetate copolymer (5×7 cm piece, 4 pieces, 0.6860 g) was impregnated with an aqueous solution (0.1022 g/1.8 ml) of sodium metasilicate.9 hydrate, and a mixed aqueous solution (1.8 ml) of sodium aluminate (0.0842 g) and sodium hydroxide (0.1800 g) was added, which was followed by immersion at 50° C. for 48 hours, to give 4A zeolite-holding ethylene-vinyl acetate copolymer (0.7228 g). The obtained 4A zeolite-holding ethylene-vinyl acetate copolymer had a 4A zeolite-holding percentage of 5.1 wt%. An SEM photograph of the surface of the obtained 4A zeolite-holding ethylene-vinyl acetate copolymer is shown in FIG. 7a and an SEM photograph of the cross section thereof is shown in FIG. 7b.

Comparative Example 1

Figure 8A:
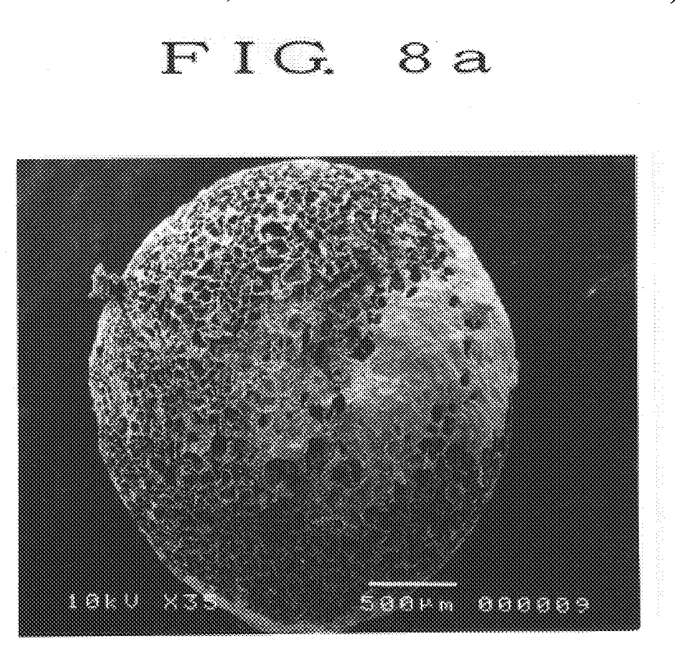
FIG. 8a is an SEM photograph of aluminosilica gel-holding cellulose beads obtained in Comparative Example 1.
Figure 8B:
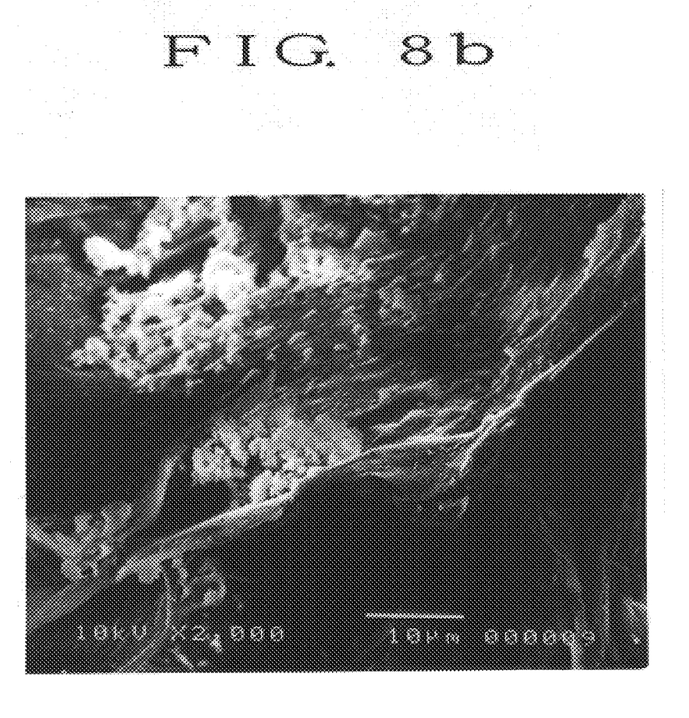
FIG. 8b is an SEM photograph showing an enlarged view of the cellulose beads.

Cellulose beads (10.0 g, average particle size 5 mm) were impregnated with an aqueous solution (5.68 g/100 ml) of sodium metasilicate.9 hydrate, and sodium aluminate (4.68 g/100 ml) was added, which was followed by immersion at 25° C. for 1 hour, to give aluminosilica gel-holding cellulose beads (11.3 g). The aluminosilica gel-holding cellulose beads had an aluminosilica gel-holding percentage of 19.8 wt%. An SEM photograph of the obtained aluminosilica gel-holding cellulose beads is shown in FIG. 8a and an enlarged view thereof is shown in FIG. 8b.

Comparative Example 2

Figure 9A:
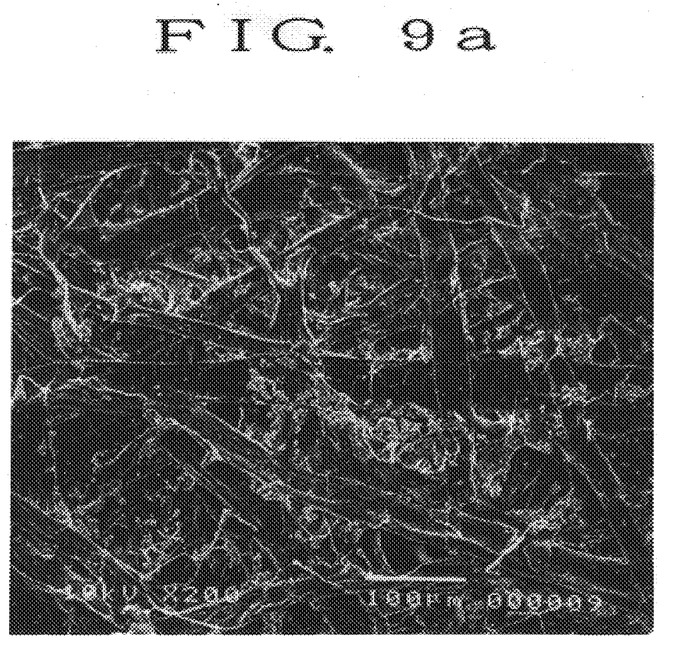
FIG. 9a is an SEM photograph of 4A zeolite-carrying paper obtained in Comparative Example 2.
Figure 9B:
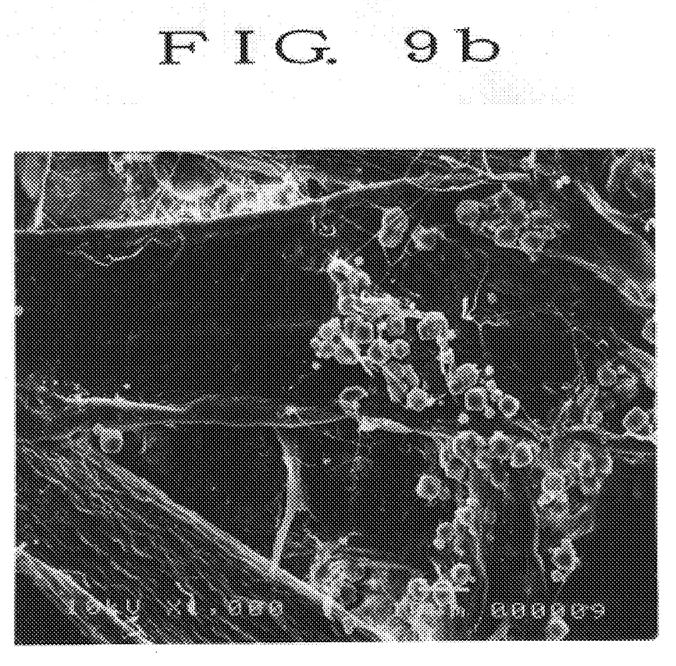
FIG. 9b is an SEM photograph showing an enlarged view of the paper.

Pulp (4.0 g) was impregnated with an aqueous suspension of commercially available zeolite (manufactured by TOSOH CO., LTD., 4A Zeolum, 3.7 g/100 ml) at 90° C. for 2 hours, to give 4A zeolite-carrying pulp. The 4A zeolite-carrying pulp was processed into paper using Square Type Sheet Machine manufactured by KUMAGAYA RIKI INDUSTRY Co., Ltd. (conditions: 80 mesh, natural water, suction, water 15ℓ). The 4A zeolite-carrying paper thus obtained had a 4A zeolite-carrying percentage of 6.8 wt%. An SEM photograph of the obtained 4A zeolite-carrying paper is shown in FIG. 9a and an enlarged view thereof is shown in FIG. 9b.

Comparative Example 3

Figure 10A:
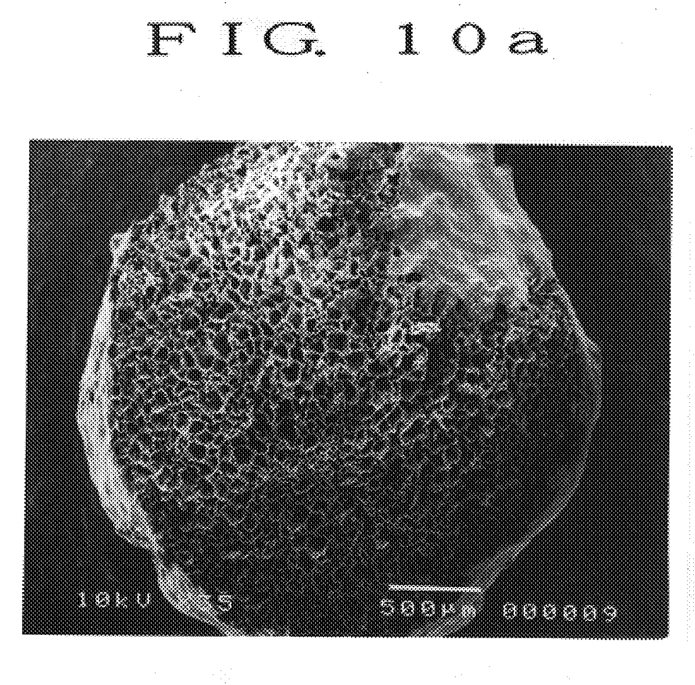
FIG. 10a is an SEM photograph of 4A zeolite-carrying cellulose beads obtained in Comparative Example 3.
Figure 10B:
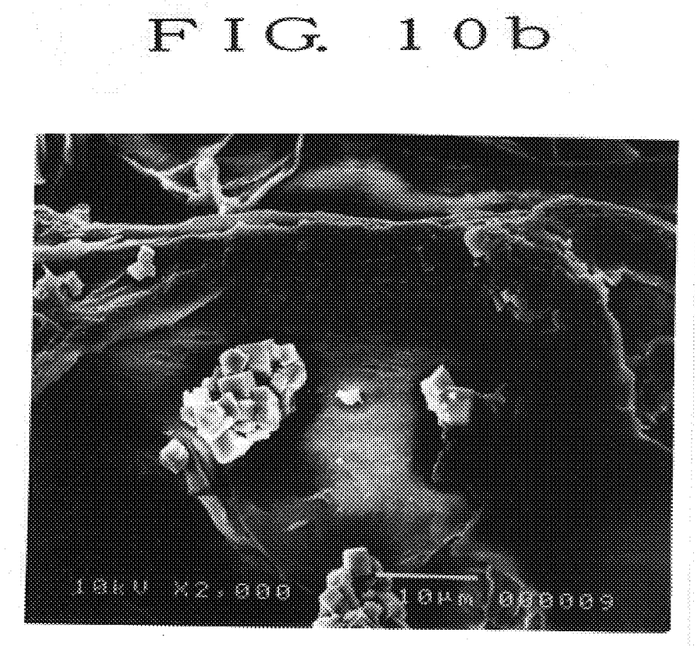
FIG. 10b is an SEM photograph showing an enlarged view of the cellulose beads.

Cellulose beads (10.0 g, average particle size 5 mm) were impregnated with an aqueous suspension of commercially available zeolite (manufactured by TOSOH CO., LTD., 4A Zeolum, 2.5 g/100 ml) at 90° C. for 2 hours, to give 4A zeolite-carrying cellulose beads. The 4A zeolite-carrying cellulose beads had a 4A zeolite-carrying percentage of 5.5 wt%. An SEM photograph of the obtained 4A zeolite-carrying cellulose beads is shown in FIG. 10a and an enlarged view thereof is shown in FIG. 10b.

Comparative Example 4

Used were untreated cellulose beads as used in Examples and Comparative Examples, which contained nothing else.

It is evident from the SEM photographs that, in the zeolite-holding cellulose beads obtained in Examples 1 to 4, zeolite-holding cellulose paper and zeolite-holding cellophane, the zeolite was held in the inner matrix of hydrophilic macromolecule. It is also evident from the SEM photograph showing the cross section that, in the 4A zeolite-holding ethylene-vinyl acetate copolymer obtained in Example 7, the 4A zeolite was held in the inner matrix of the ethylene-vinyl acetate copolymer.

With respect to the hydroxyapatite-holding cellulose beads and hydrotalcite-holding cellulose beads obtained in Examples 5 and 6, the particle size of hydroxyapatite and hydrotalcite is too small even in SEM photographs, and it is inconclusive if the hydroxyapatite and hydrotalcite were held in the inner matrix of the cellulose beads. However, the ash obtained from incineration of hydroxyapatite-holding cellulose beads and hydrotalcite-holding cellulose beads retained the shape of cellulose beads. In consideration of greater amount held by the beads, moreover, it is appreciated that the beads held hydroxyapatite and hydrotalcite.

Experimental Example 1

Each sample (1.0 g) obtained in Example 1, and Comparative Examples 1, 3 and 4 was immersed in an aqueous solution of silver nitrate (2.33 g/$\ell$, 1480 ppm) or an aqueous solution of copper sulfate.5 hydrate (1.71 g/$\ell$, 435 ppm) at 25° C. for 2 hours, and the removal percentage of metal ion ((initial concentration-final concentration)×100/initial concentration) was calculated.

The results are shown in Tables 1 and 2.

TABLE 1 removal of silver ion

| | removal percentage (%) |
|---|---|
| Example 1 | 91.9 |
| Comparative Example 1 | 19.6 |
| Comparative Example 3 | 21.0 |
| Comparative Example 4 | 6.8 |

TABLE 2 removal of copper ion

| | removal percentage (%) |
|---|---|
| Example 1 | 90.3 |
| Comparative Example 1 | 20.8 |
| Comparative Example 3 | 19.4 |
| Comparative Example 4 | 5.6 |

Experimental Example 2

The silver-substituted 4A zeolite-holding cellulose beads (hereinafter inventive product (silver)) and copper-substituted 4A zeolite-holding cellulose beads (hereinafter inventive product (copper)), both obtained in Experimental Example 1 by substituting the 4A zeolite-holding cellulose beads of Example 1 with silver and copper; the copper-substituted product (hereinafter Comparative Example 1 (copper)) obtained in Experimental Example 1 by substituting the aluminosilica gel-holding cellulose beads of Comparative Example 1 with copper; the copper-substituted product (hereinafter Comparative Example 3 (copper)) obtained in Experimental Example 1 by substituting the zeolite-carrying cellulose beads of Comparative Example 3 with copper; and the copper-substituted product (hereinafter Comparative Example 4 (copper)) obtained in Experimental Example 1 by substituting the cellulose beads of Comparative Example 4 with copper were used as samples (1.0 g each) to examine removal property for hydrogen sulfide gas (1000 ppm, 1 $\ell$). As a control, a copper powder (0.016 g) was used. The amount of the copper powder was determined according to the copper content of the inventive product (copper).

Figure 11:
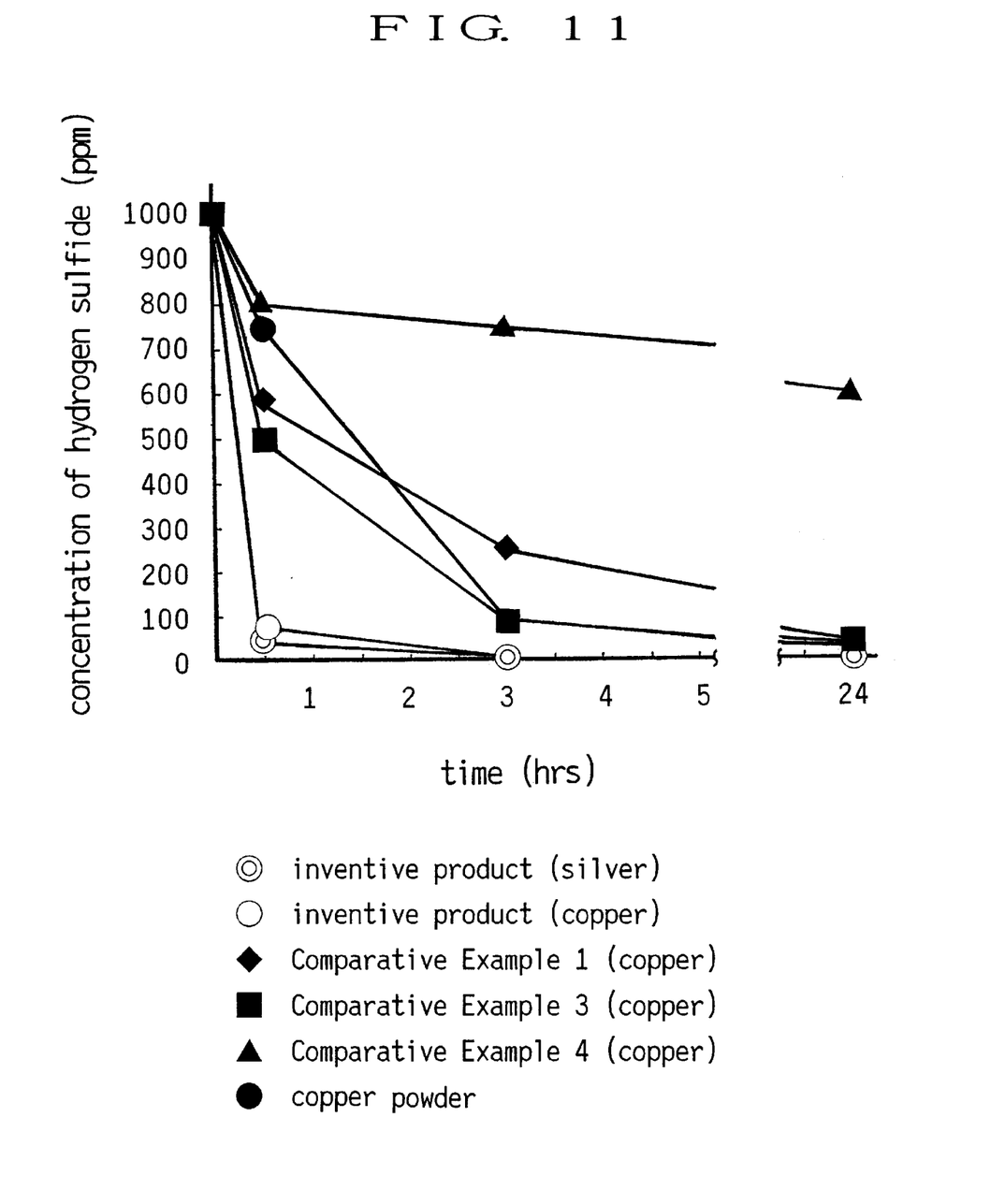
FIG. 11 shows time course changes in hydrogen sulfide gas adsorption by metal-substituted 4A zeolite-holding cellulose beads (inventive products (silver or copper)), metal-substituted aluminosilica gel-holding cellulose beads (Comparative Example 1 (copper), Comparative Example 3 (copper) and Comparative Example 4 (copper)) and copper powder.

The results are shown in Table 3 and FIG. 11.

TABLE 3

| | concentration (ppm) of hydrogen sulfide in residual gas | | | |
|---|---|---|---|---|
| | initial concentration | 30 min. later | 3 hours later | 24 hours later |
| inventive product (silver) | 1000 | 50 | 0 | 0 |
| inventive product (copper) | 1000 | 80 | 0 | 0 |
| Comparative Example 1 (copper) | 1000 | 580 | 250 | 20 |
| Comparative Example 3 (copper) | 1000 | 500 | 100 | 15 |
| Comparative Example 4 (copper) | 1000 | 800 | 750 | 600 |
| Copper powder | 1000 | 750 | 100 | 0 |

From the results of Table 1, it is evident that the inventive 4A zeolite-holding cellulose beads were extremely superior in silver ion and copper ion removing performance. It is also evident from Table 2 and FIG. 11 that the inventive silver-substituted 4A zeolite-holding cellulose beads and copper-substituted 4A zeolite-holding cellulose beads both showed quick hydrogen sulfide adsorption to the extent that hydrogen sulfide was completely removed in 3 hours. The superior hydrogen sulfide removing property was apparent, as compared to that by the copper powder.

According to the present invention, an inorganic porous crystals-hydrophilic macromolecule composite holding the inorganic porous crystals in the inner matrix of hydrophilic macromolecular substrate can be obtained. Said hydrophilic macromolecule composite is particularly superior in adsorption of metal ion, specifically silver and copper ions, and the metal-holding inorganic porous crystals-hydrophilic macromolecule composite showed noticeably strong adsorption of hydrogen sulfide, so that it can be used as a deodorizer, antimicrobial material and freshness retention material for fruits and vegetables.

This application is based on application No. 245538/1996 filed in Japan, the content of which is incorporated hereinto by reference.

What is claimed is:

1. An inorganic porous crystals-hydrophilic macromolecule composite comprising a hydrophilic macromolecular substrate containing the inorganic porous crystals in its inner matrix.

2. The inorganic porous crystals-hydrophilic macromolecule composite of claim 1, wherein the hydrophilic macromolecular substrate is a cellulose substrate.

3. The inorganic porous crystals-hydrophilic macromolecule composite of claim 1, wherein the inorganic porous crystal is zeolite.

4. A method for producing an inorganic porous crystals-hydrophilic macromolecule composite, which comprises reacting plural water-soluble compounds and at least one basic substance, in the inner matrix of a swollen hydrophilic macromolecular substrate, wherein the swollen hydrophilic macromolecular substrate is sequentially exposed to the plural water-soluble compounds.

5. The method according to claim 4, wherein the plural water-soluble compounds comprise at least one silicon compound and at least one aluminum compound.

6. The method according to claim 4, wherein the reaction is carried out at 20–90° C.

7. The method according to claim 4, wherein the basic substance has a concentration of 10–5000 mmol/$\ell$.

8. The method according to claim 5, wherein the silicon compound, aluminum compound and basic substance are mixed in a molar ratio (silicon compound:aluminum compound:basic substance) of 1:1–10:10–50.

9. The method according to claim 4, wherein the basic substance is sodium hydroxide or potassium hydroxide.

10. A method for producing an inorganic porous crystals-hydrophilic macromolecule composite, which comprises impregnating a hydrophilic macromolecular substrate with an aqueous solution of one of silicon compound and aluminum compound, and mixing an aqueous solution of the other of the silicon compound and aluminum compound in the presence of at least one basic substance, thereby to hold inorganic porous crystals in the inner matrix of the hydrophilic macromolecular substrate.

11. A metal-holding inorganic porous crystals-hydrophilic macromolecule composite, comprising the inorganic porous crystals-hydrophilic macromolecule composite of claim 1 and at least one kind of metal held on the composite, which is selected from the group consisting of silver, copper, zinc, iron, nickel, cobalt, palladium and platinum.

12. The method of claim 5, wherein the substrate is exposed to the at least one silicon compound prior to being exposed to the at least one aluminum compound.

13. The method of claim 5, wherein the substrate is exposed to the at least one aluminum compound prior to being exposed to the at least one silicon compound.

* * * * *